United States Patent [19]
Gill

[11] Patent Number: 5,567,003
[45] Date of Patent: Oct. 22, 1996

[54] TENT CAMPER WITH SLIDE-OUT ROOM

[75] Inventor: Jeffrey J. Gill, Argos, Ind.

[73] Assignee: Damon Ventures, LLC, Elkhart, Ind.

[21] Appl. No.: 235,057

[22] Filed: Apr. 29, 1994

[51] Int. Cl.$^6$ .................................................. B60P 3/32
[52] U.S. Cl. .......................................... 296/173; 296/171
[58] Field of Search .................................. 296/173, 171,
296/170, 168, 26, 27, 175, 165, 164, 156

[56] References Cited

U.S. PATENT DOCUMENTS

| | | | |
|---|---|---|---|
| 2,493,258 | 1/1950 | Massare | 296/173 |
| 3,549,193 | 12/1970 | Hunter | 296/173 |
| 3,583,755 | 6/1971 | Hedrick, Jr. | 296/27 X |
| 3,596,416 | 8/1971 | Hojka | 296/173 X |
| 3,680,908 | 8/1972 | Bowen | 296/27 X |
| 3,709,551 | 1/1973 | McCarthy | 296/27 X |
| 3,941,414 | 3/1976 | Platt | 296/27 X |
| 4,463,982 | 8/1984 | Irelan | 296/27 X |
| 4,480,866 | 11/1984 | Komatsu | 296/171 X |
| 4,500,132 | 2/1985 | Yoder | 296/171 |
| 4,657,300 | 4/1987 | Penny et al. | 296/27 X |
| 5,050,927 | 9/1991 | Montanari | 296/165 |
| 5,154,469 | 10/1992 | Morrow | 296/171 X |
| 5,237,782 | 8/1993 | Cooper | 296/171 X |
| 5,280,687 | 1/1994 | Boiteau | 296/171 X |

FOREIGN PATENT DOCUMENTS

| | | | |
|---|---|---|---|
| 1229431 | 9/1960 | France | 296/171 |
| 2835166 | 2/1980 | Germany | 296/169 |

*Primary Examiner*—Joseph D. Pape
*Attorney, Agent, or Firm*—Baker & Daniels

[57] ABSTRACT

A tent camper with a lateral slide-out room. The tent camper includes a camper main body that is pulled in a longitudinal direction by a towing vehicle. A roof, aligned above the camper main body, is movable between a lowered, storage position and a raised, camping position. A lateral slide-out room is coupled to the camper main body. The lateral slide-out room is movable in a lateral direction between a retracted, storage position and an extended, operational position, thereby allowing additional living space to be provided to persons within the tent camper.

14 Claims, 8 Drawing Sheets

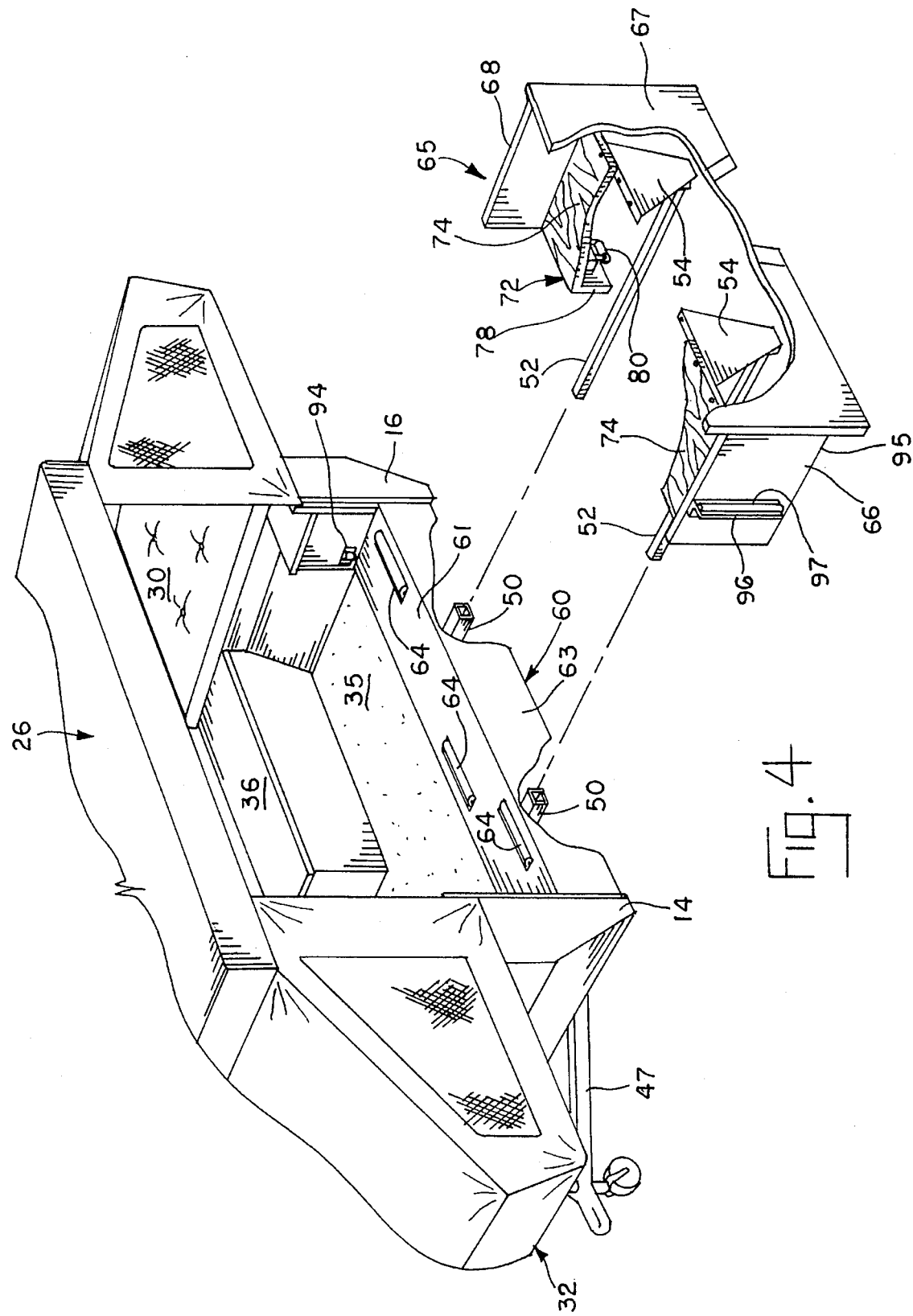

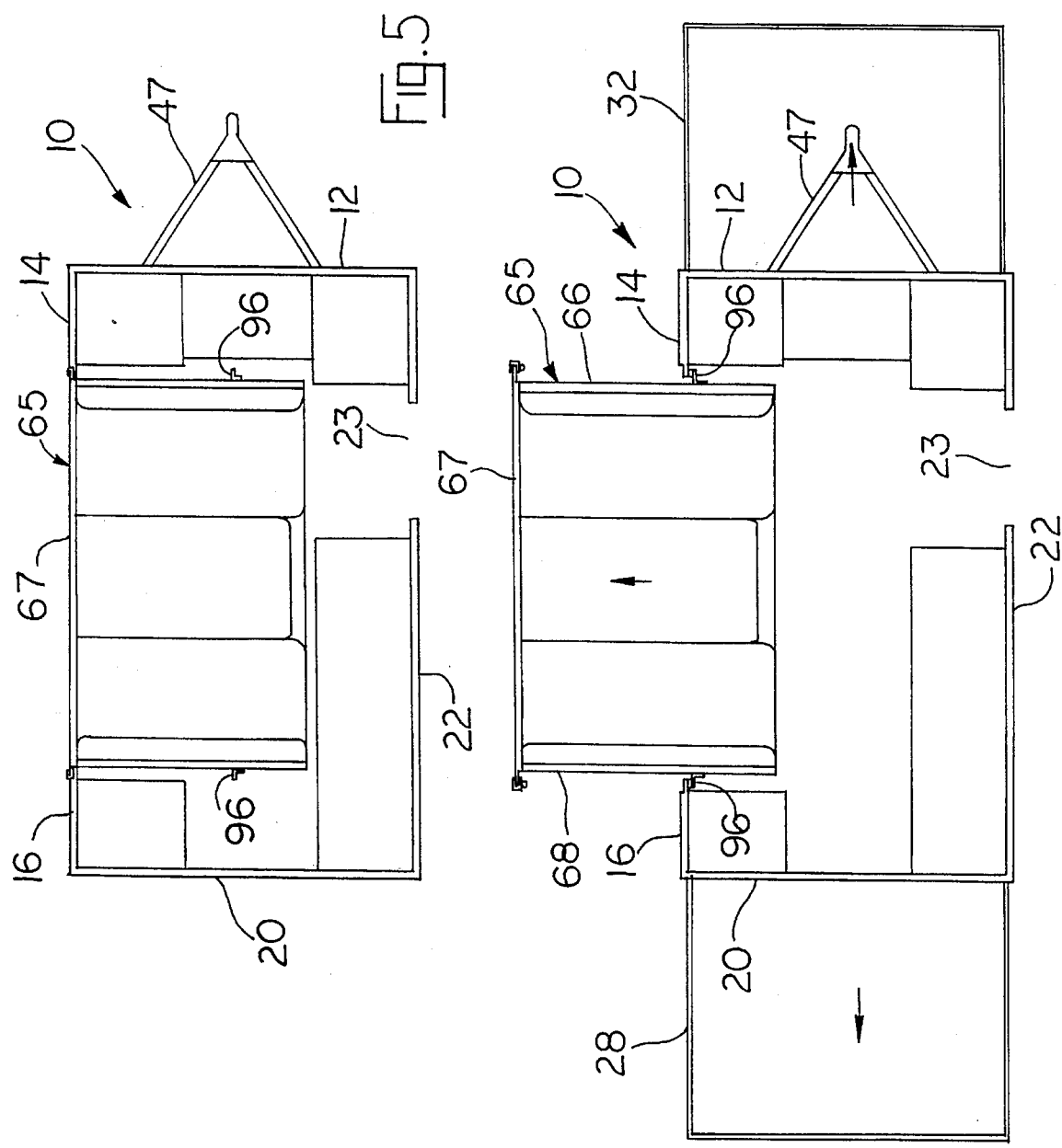

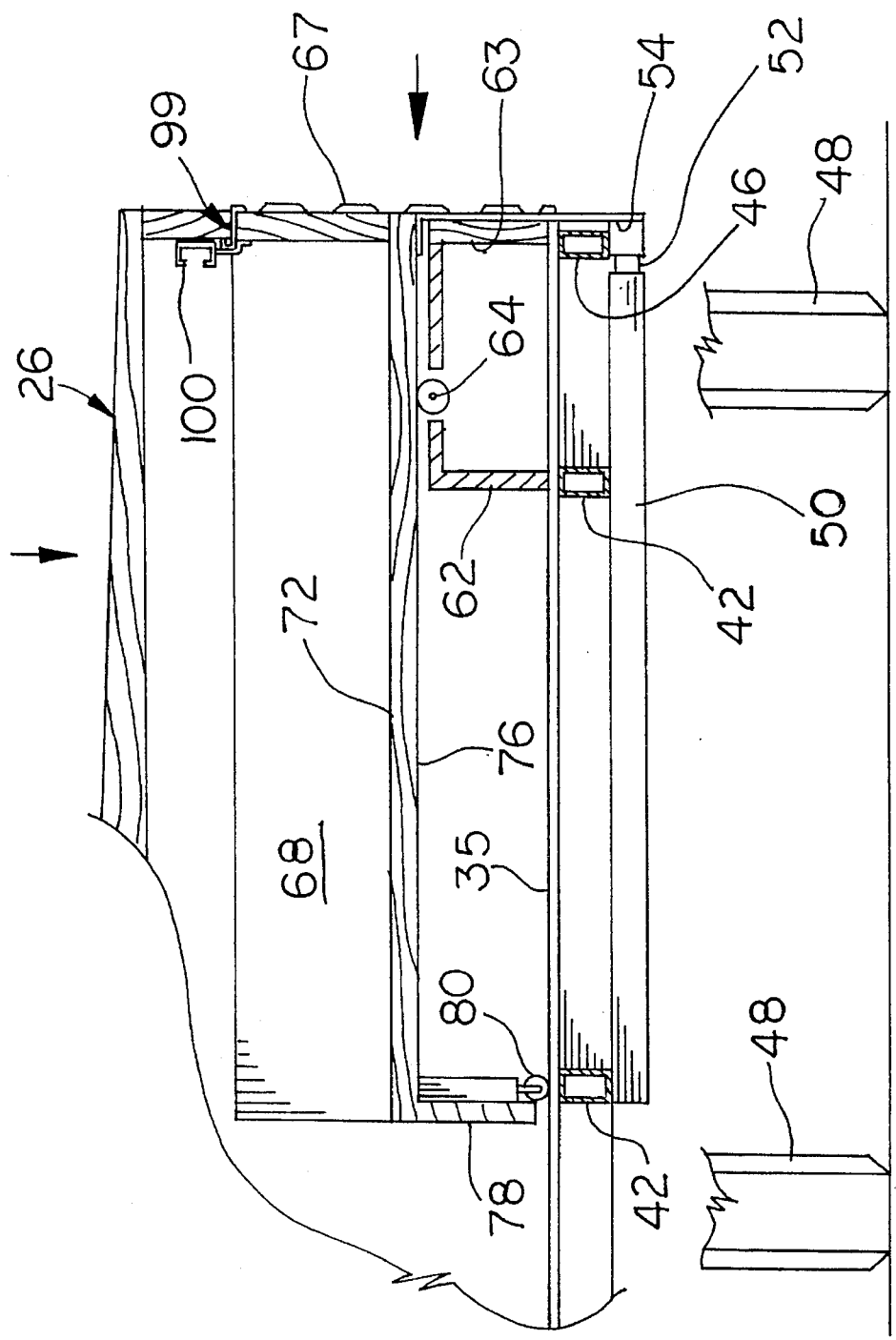

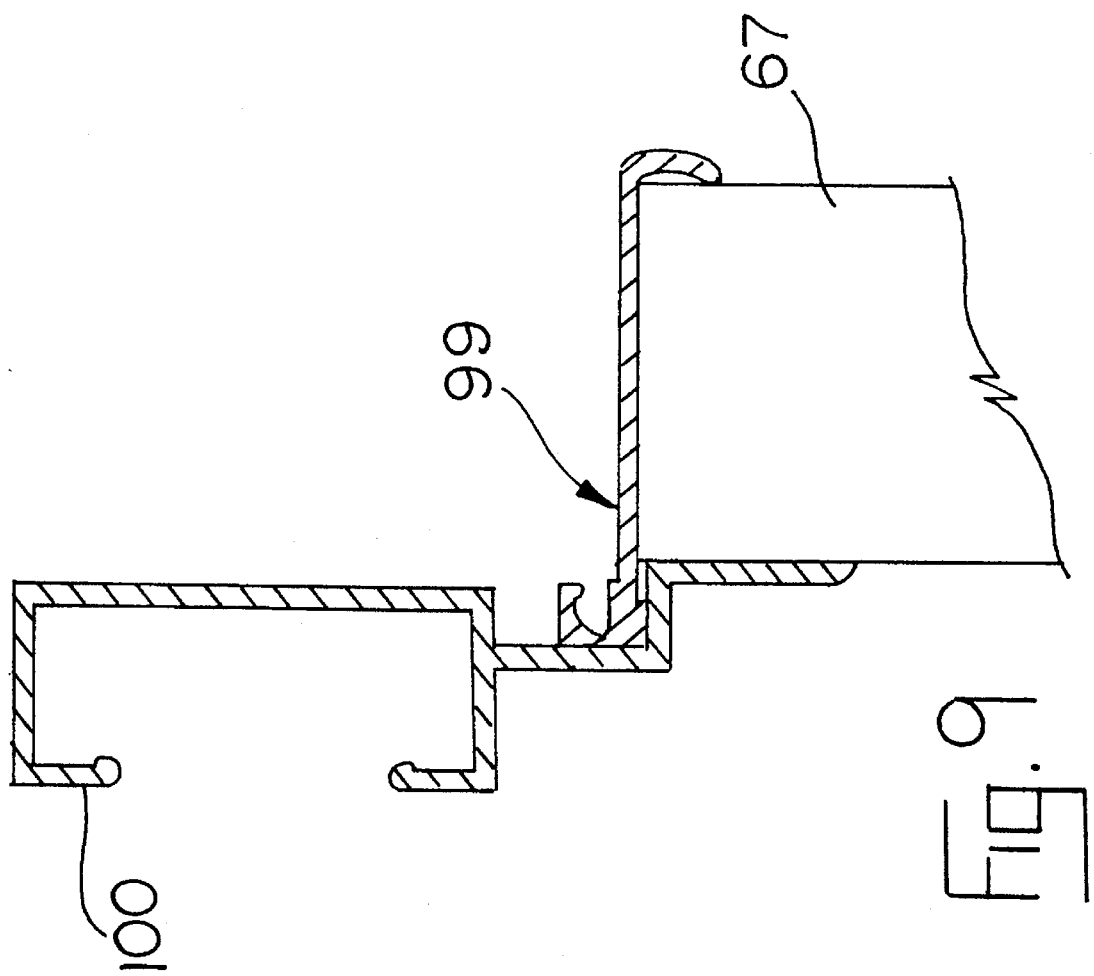

TENT CAMPER WITH SLIDE-OUT ROOM

BACKGROUND OF THE INVENTION

This invention pertains to tent campers, and, in particular, to a tent camper with a slide-out room which increases the living space of the camper.

Tent campers or tent camper trailers are portable housing structures frequently employed during camping outings to furnish campers at a campsite with some of the comforts of home. Tent campers are typically towed behind a vehicle to a campsite while arranged in a collapsed, compact alignment having a low profile. Upon reaching the campsite, the tent camper is arranged in an expanded, high profile use position by raising the roof or top of the camper.

A shortcoming of existing tent campers is the crowded and cramped living quarters they are able to provide. To increase the effective living space, typical tent camping trailers include bed wings or rooms which can be extended in a longitudinal or fore and aft direction from the tent camper body when the top is raised during the conversion of the tent camper from its compact alignment to its expanded, use alignment. These bed wings provide sleeping accommodations for campers.

While presently extendable to some extent in the longitudinal direction, existing tent campers still are limited as to the living space which can be provided. In particular, the width of the provided living space has in the past been dictated by the lane size of roads over which the campers are transported. Large travel trailers or dedicated recreational vehicles, which have fixed, full side walls and end walls which extend between a fixed roof and floor, have on occasion included laterally extendable rooms. However, the standard construction of such rooms discredited the feasibility of their application in tent campers. In particular, a room of this type in travel trailers was normally self-supporting, due in part to the extendable room frame telescopically connecting to the heavy duty framework of the vehicle and also due to a lipped connection between the sturdy walls of the extendable room and the portions of the vehicle side walls proximate the roof. Thus, while hindered by the relatively limited structural integrity of tent campers, it is desirable to provide a laterally extending room for tent campers to enlarge the available camper living space.

SUMMARY OF THE INVENTION

In one form thereof, the present invention provides a tent camper, for use with a towing vehicle, including a structural framework connectable to the towing vehicle, ground engaging wheels operationally mounted to the structural framework, a camper main body supported by the structural framework a roof aligned above the camper main body, wherein the roof is movable between a lowered, storage position and a raised, camping position, enclosure means extending between the camper main body and the roof, and a lateral slide-out room coupled to the camper main body. The lateral slide-out room is movable in a lateral direction between a retracted, storage position and an extended, operational position, thereby capable of providing additional living space to persons within the tent camper.

The lateral slide-out room may include a rigid base platform assembly and a collapsible top covering the platform assembly. The base platform assembly includes a front wall panel, a side wall panel, a rear wall panel, and a floor.

An advantage of the tent camper with the lateral slide-out room of the present invention is that a tent camper is provided with increased living space when expanded. Another advantage of the present invention is that the slide-out room may be laterally extended and retracted manually and with limited effort. Another advantage of the present invention is that a lateral slide-out room is provided without overly complicating manufacture and assembly. Other advantages of the present invention will become apparent from the following description.

BRIEF DESCRIPTION OF THE DRAWINGS

FIG. 4 shows a partial perspective view of the tent camper of FIG. 2 with the slide-out room detached from the camper body for purposes of illustration, wherein the base platform assembly of the slide-out room is shown and the wherein the living quarters of the camper body are shown.

FIG. 5 shows a diagrammatic top view of the tent camper of FIG. 1, with the roof and folded fabric room enclosures not shown for purposes of illustration, showing a representative living space arrangement with the slide-out room retracted.

FIG. 6 shows a diagrammatic top view of the tent camper of FIG. 2, with the roof and folded fabric room enclosures not shown for purposes of illustration, showing the increased living space arrangement with the slide-out room expanded.

FIG. 8 is a partial, front cross-sectional view taken along line 8—8 of FIG. 1, showing the slide-out room when in its retracted position.

FIG. 9 is an enlarged view of a locking top cap.

Figure 1:
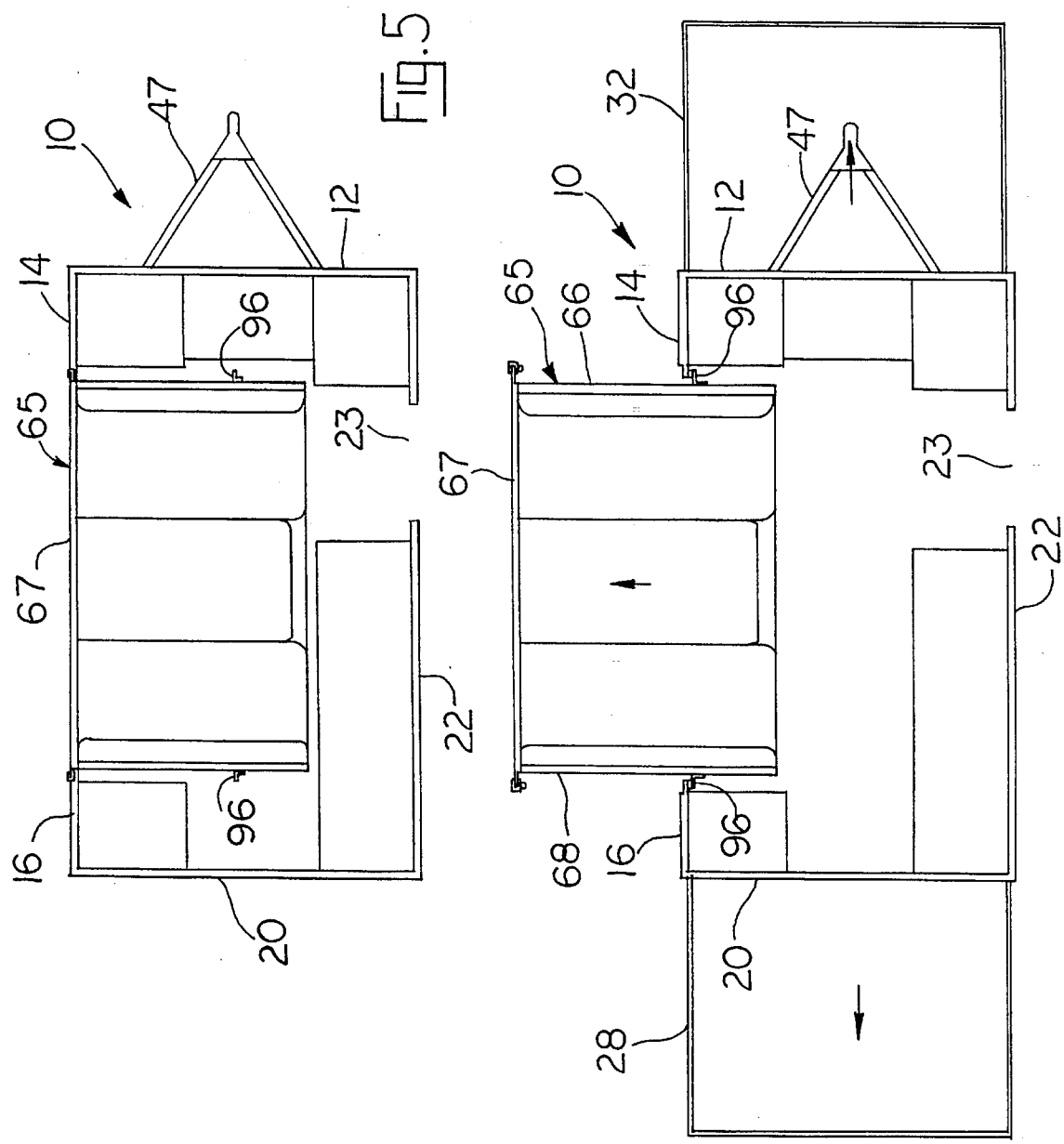
FIG. 1 shows a perspective view of the tent camper of the present invention when arranged in the collapsed and compact alignment used for travel and storage.

Corresponding reference characters indicate corresponding parts throughout the several figures. Although the drawings represent an embodiment of the invention, the drawings are not necessarily to scale and certain features may be exaggerated in order to better illustrate and explain the present invention.

DESCRIPTION OF THE PREFERRED EMBODIMENT

The preferred embodiment illustrated in not intended to be exhaustive or to limit the invention to the precise form disclosed. The embodiment was chosen and described in order to best explain the principles of the invention and its application and practical use to thereby enable others skilled in the art to best utilize the invention.

Referring to FIG. 1, the preferred tent camper of the present invention, generally designated 10, is shown in a collapsed, compact alignment. Tent camper 10 is arranged in this low profile alignment for traveling transport as well as for storage to minimize the space occupied. The exterior of tent camper 10 is shown having a front end wall 12 and a side wall assembly including side end segments 14, 16 and slide-out side wall panel 67. As shown in FIG. 5, tent camper 10 also includes a rear end wall 20, an opposite side wall 22 with door access 23, and a horizontal, rectangular floor 35. Though illustrated herein as being of one piece construction, it will be appreciated that typically these walls, as well as the slide-out room wall panels, have a solid interior sub-wall with an exterior facade of siding attached thereto. When camper 10 is aligned for travel, walls 12, 20, 22, and the side wall assembly substantially define the perimeter of the camper main body 25 (see FIG. 5). As is conventional, main body 25 is rectangular in shape, but could be otherwise shaped if desired.

Tent camper 10 also includes a vertically movable top or roof 26 disposed directly over and covering camper main body 25. Roof 26 can be moved between a raised or expanded position shown in FIG. 2 and a lowered or compact position shown in FIG. 1 by any of a variety of mechanisms well known in the art. When arranged in the travel alignment, tent camper 10 appears substantially similar to typical existing tent campers.

Figure 2:
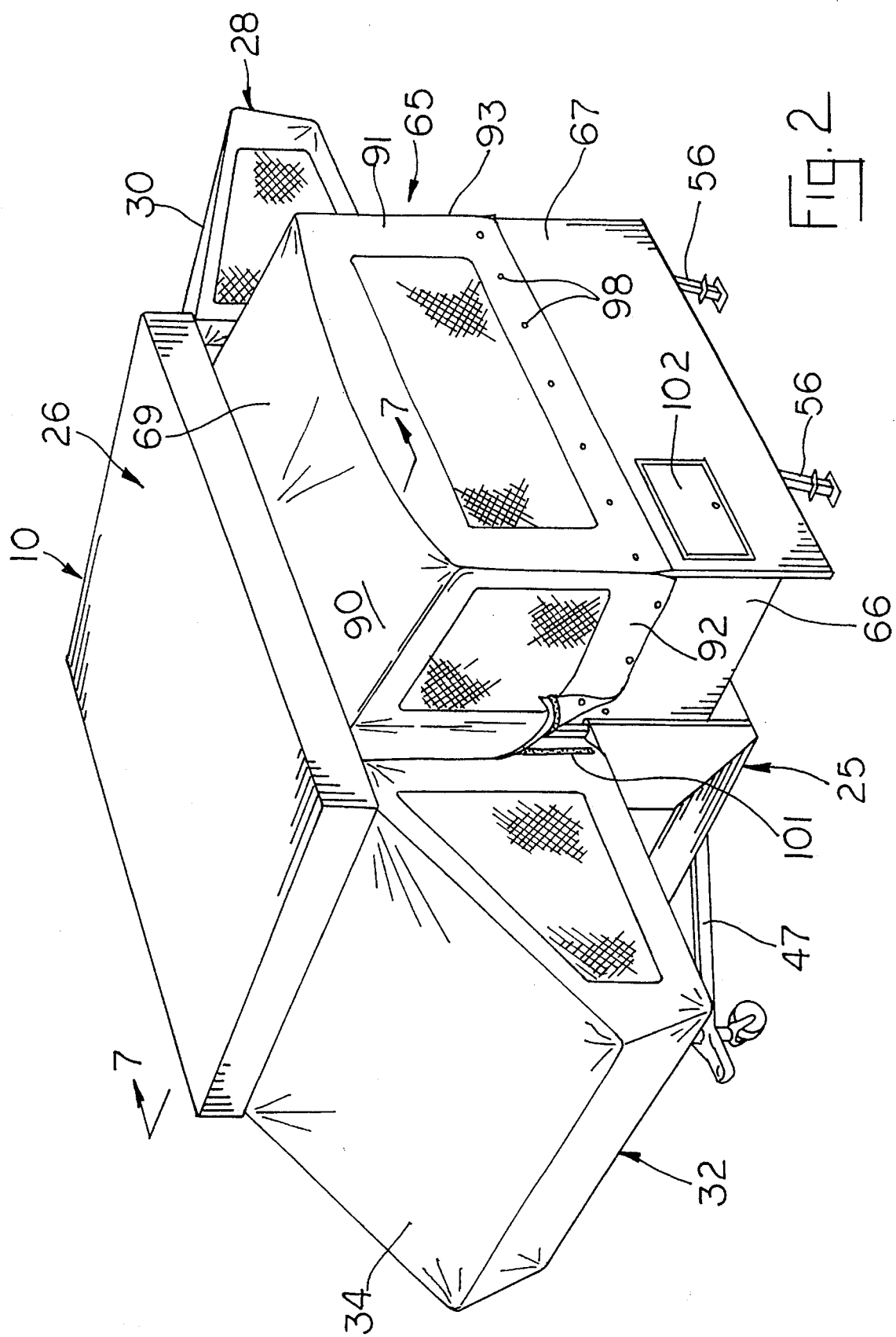
FIG. 2 shows a perspective view of the tent camper of FIG. 1 when the tent camper has been converted to its expanded, camping alignment such that a slide-out room laterally extends from the camper body.

Referring now to its expanded, use alignment shown in FIG. 2, tent camper 10 includes a pair of conventional wings or rooms 28, 32 which slide longitudinally, i.e. the direction in which tent camper 10 is normally towed by a vehicle, from tent camper main body 25. Rooms 28, 32 are retractable into camper main body 25 and thereby beneath roof 26 for storage. When extended and expanded into an operational alignment, rooms 28, 32 are respectively covered by portions 30, 34 of an enclosure which extends between roof 26 and camper main body 25. As is well known in the art, this type of enclosure is made of a foldable fabric or other suitable, preferably flexible material. As is conventional in the art, rooms 28, 32 may house mattresses and serve as sleeping berths when extended. In some constructions, the enclosure which extends between the roof and main body can be formed of foldable wall partitions.

Referring to both FIGS. 2 and 6, extending laterally from tent camper main body 25 is a slide-out room, generally designated 65. When fully extended as shown in FIG. 2, slide-out room 65 increases the useful living area of tent camper 10. Slide-out room 65, described more fully below, is shown generally including an expanded front wall 66, side wall 67, rear wall 68, and a flexible roof 69 connected to camper roof 26.

Figure 3:
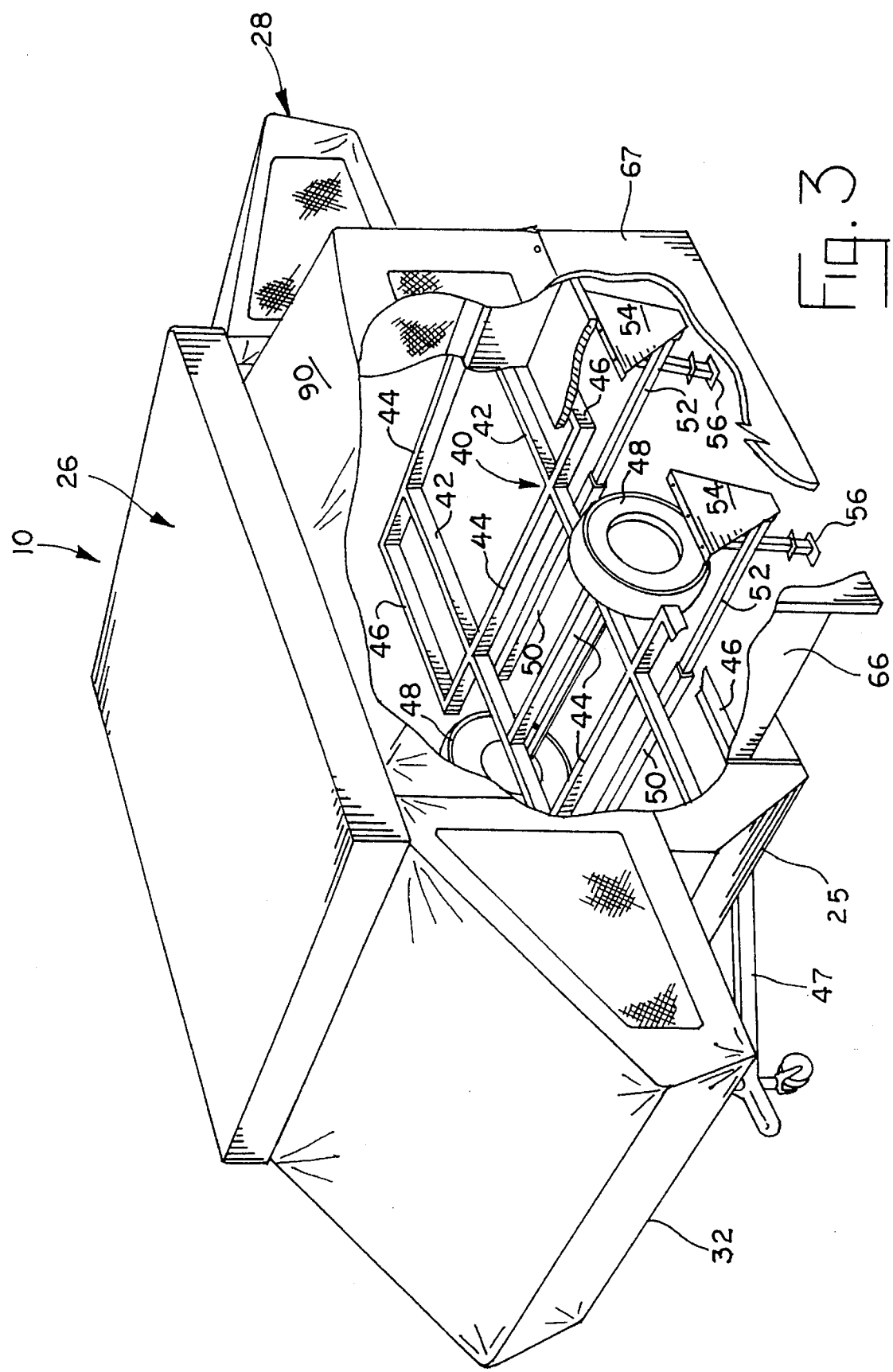
FIG. 3 shows the tent camper of FIG. 2, wherein a portion of the tent camper is fragmented for illustrative purposes to reveal the supporting structural framework of the tent camper body and the connected support frame of the laterally extending slide-out room.

The preferred structural framework supporting main body 25 of tent camper 10 is shown in FIG. 3 and is generally designated 40. It will be appreciated that differently shaped and constructed frameworks can be utilized within the scope of the present invention. Framework 40 includes a pair of longitudinal beams 42, which are spanned by numerous cross beams 44 with longitudinal braces 46. At it's forward end, framework 40 includes a tongue 47 to which is mounted a hitch connectable to the vehicle used to tow tent camper 10. Wheels 48 are journaled to framework 40 in a manner well known in the art. To provide a track for the support frame of slide-out room 65 to promote its lateral extension and retraction in a direction preferably perpendicular to supporting framework 40, a pair of hollow guide tubes 50 are rigidly attached to the underside of longitudinal beams 42.

Guide tubes 50 telescopically receive horizontally disposed support shafts 52 of the support frame of slide-out room 65. A vertically extending bracket 54 is attached to the outward end of each shaft 52. A pair of diagrammatically shown stabilizer or support pods 56 (See also FIG. 7) are mounted on shafts 52 just behind brackets 54. Pods 56 serve a weight supporting function and stabilize slide-out room 65 in preventing rocking or wobbling motion of tent camper 10 when slide-out room 65 is laterally extended at a campsite. Stabilizer pods 56 are preferably both pivoting and telescoping to provide for storage when the room is retracted and for secure ground engagement when the room is extended. In particular, in order to be adapted to provide weight support, pods 56 are first pivoted downward from a raised, storage position in which they are substantially horizontally aligned to a lowered, operational position in which they are substantially vertically aligned with the lower end spaced from the ground. Pods 56 are then further adjusted telescopically such that the pod lower end engages the ground. It will be appreciated that alternate constructions of stabilizer pods 56, such as constructions which recess vertically or solely telescope between raised and lowered positions, are within the scope of the present invention.

Figure 7:
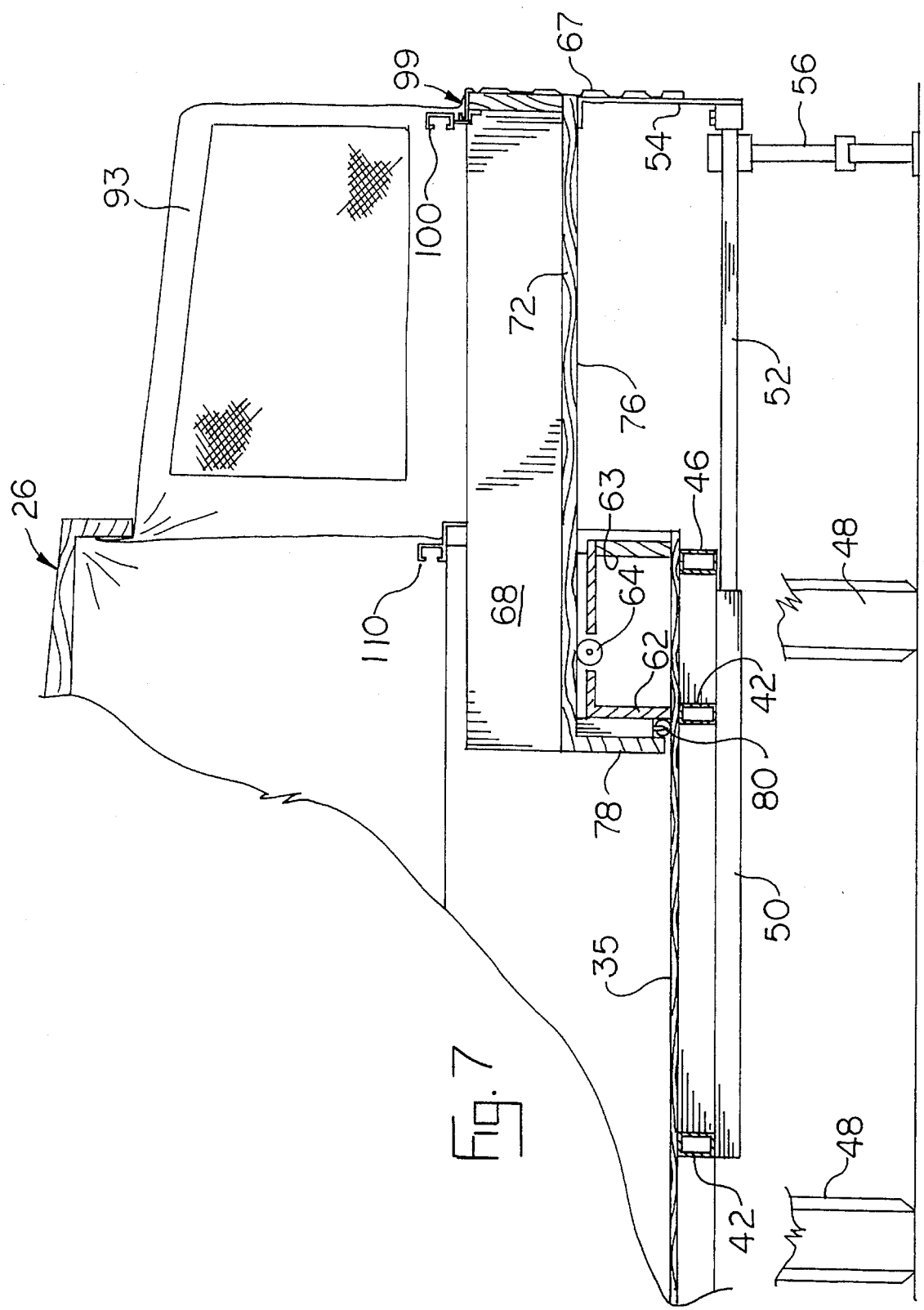
FIG. 7 is a partial, front cross-sectional view taken along line 7—7 of FIG. 2, showing the slide-out room when in its extended position.

Referring now to FIG. 4, the interior of main body 25 installed on structural framework 40 includes floor 35. A structure or cabinet 36, built on floor 35 and over right wheel 48 serves as part of the wheel well and can be of various configurations and can accommodate, for example, a range, sink, or water tank. Affixed to floor 35 over left wheel 48 is a support plate assembly, generally designated 60, which serves as part of the wheel well and preferably extends the entire longitudinal length between side end segments 14, 16. As shown in FIGS. 7 and 8, support plate assembly 60 includes an upper, horizontal plate 61 and opposing side, vertical plates 62, 63. Extending beyond the top surface of upper plate 61 are rollers 64 which are recessed within or preferably installed on the upper plate. Rollers 64 facilitate the lateral extension and retraction of slide-out room 65, as the provided rolling surface for slide-out room 65 reduces frictional forces.

Slidably mounted on and above support plate assembly 60 is slide-out room 65, which includes both a rigid base platform assembly and a collapsible top. This base platform assembly is essentially formed of orthogonally configured slide-out side wall panel 67, front wall panel 66, rear wall panel 68, and floor panel 72. As best shown in FIGS. 4 and 7, slide-out room floor panel 72 includes a planar top surface 74, a planar bottom surface 76, and a downwardly extending, perpendicular flange 78 at its inward side edge. Floor panel 72 can be securely attached in a non-slip fashion to an upper horizontal flange of support frame bracket 54 with suitable fasteners. Bottom surface 76 preferably directly contacts rollers 64. Alternatively, bottom surface 76 could be supplied with intervening wear resistant raceways and thereby operationally contact rollers 64 indirectly. Additional rollers 80 are mounted to the outward surface of flange 78 and project slightly below flange 78. Rollers 80 achieve low-friction rolling contact with main body floor 35 when slide-out room 65 is laterally moved. It will be appreciated that floor 72 can support a wide variety of structures built thereon, and various floor plans for slide-out room 65 such as a dinette can be employed.

Front wall panel 66 and rear wall panel 68 are securely mounted to floor top surface 74 and are coterminous with the floor inward side edge. Vertically extending stops 96 (See FIGS. 4 and 6) are rigidly secured to both the forward surface of front wall panel 66 and the rearward surface of rear wall panel 68. Seal elements 97 on outward sides of stops 96 keep water from the interior compartment of tent camper 10 as well as serve as cushions when the slide-out room 65 is extended. Stops 96 engage overhanging lips of side end segments 14 16 to positively halt the extent to which slide-out room 65 can be laterally extended.

Slide-out side wall panel 67, while shown as a unitary panel extending below slide-out room floor panel 72 includes a solid interior sub-wall mounted to floor top surface 74 and a siding facade attached to this interior wall which projects downwardly. A lockable access door 102 can be provided in slide-out side wall panel 67 (see FIG. 2) to access contents of slide-out room 65 or storage compartments therein. As shown in FIG. 7, attached to the top edge of side wall panel 67 is a top cap 99 which provides a finished surface and which includes a C-shaped locking channel 100. A similarly shaped channel 110 is provided on each of side end segments 14, 16. Channels 110 slidably receive the slide rails of rooms 28, 32 and provide support for rooms 28, 32 when extended. Channels 100 similarly receive the bed room slide rails when slide-out room 65 is disposed in the retracted position and rooms 28, 32 are subsequently slid to the retracted position. In this manner, slide-out room 65 is prevented from being extended, or is locked in the closed alignment, until rooms 28, 32 are longitudinally extended such that the room slide rails are withdrawn from channels 100.

As shown in FIG. 4, horizontally disposed guide rollers or bearings 94 are mounted in brackets attached to the side surfaces of constructed structures immediately inward of both side end segments 14, 16. Guide bearings 94 rollingly engage a lower marginal edge 95, preferably covered with a molding strip, of both the forward surface of front wall panel 66 and the rearward surface of rear wall panel 68 when slide-out room 65 is moved between its extended and retracted positions. In this manner, guide bearings 94 assist in the longitudinal position of slide-out room 65 relative to camper main body 25.

To maintain the compactness of tent camper 10, slide-out room 65 preferably includes a collapsible top. In particular, and with reference again to FIG. 2, slide-out room wall panels 66, 67, 68 are covered by enclosure 90, which is fixedly connected to roof 26. Formed of the same flexible material as enclosures 30, 34, enclosure 90 when expanded forms the upper portions of front wall 66, side wall 67, rear wall 68, in addition to slide-out room roof 69. The section 91 of enclosure 90 covering side wall panel 67 is connected thereto by snaps 98. Snaps 98 also are preferably used to releasably attach flaps 92, 93 of enclosure 90 to front wall panel 66 and rear wall panel 68 respectively. The interior of tent camper 10 can be adequately sealed by connecting enclosure flaps 92, 93 to enclosure section 91 with, for example, VELCRO® type connectors 101. Enclosure flaps 92, 93 are preferably so detachable to facilitate storage of slide-out room 65, as when detached flaps 92, 93 can be more readily folded into the interior compartment of slide-out room 65. Enclosure 90 may be supported in the raised condition shown in FIG. 2 by standard tent bow or a similar frame member.

The construction of tent camper 10 and slide-out room 65 will be further understood in view of an explanation of its operation. After being towed to a campsite or other destination when assembled in the compact alignment shown in FIG. 1, tent camper 10 is then expanded into the camping alignment shown in FIG. 2. In particular, roof 26 is raised, and bed wings 28, 32 are longitudinally slid out to their extended position shown and expanded. It will be appreciated that as bed wings 28, 32 are slid outward, their longitudinal slide rails previously positioned within locking channels 100 are extracted to in effect unlock slide-out room 65. Slide-out room 65 can then be laterally extended.

As slide-out room 65 is manually pulled outward, frictional forces potentially hindering room movement are kept to a low level as bottom surface 76 of slide-out room floor 72 contacts rollers 64 and rollers 80 contact camper floor 35. Thus, undue exertion by an operator is avoided. Lateral rollers 94 prevent binding contact between front panel 66, rear panel 68 and side end segments 14, 16 respectively. Slide-out room 65 is withdrawn until stop bars 96 contact side end segments 14, 16 to positively halt the withdrawal.

Stabilizer pods 56 are then manually pivoted from their horizontal storage orientation to their vertical operational orientation. Pods 56 then telescope downwardly and are locked in contact with the ground, such that a sturdy, weight supporting and stabilizing force is provided for slide-out room 65.

After enclosure 90 is propped upward, enclosure flaps 92, 93 can be snapped to the Wall panels and connected into operational alignment with enclosure section 91. Slide-out room 65 is then ready to be utilized as additional living space for tent camper 10, such as a dinette or as a place for additional storage.

To return slide-out room 65 to its storage orientation substantially within tent camper main body 25, enclosure 90 is disassembled and manipulated such that it folds inwardly into slide-out room 65 for storage, pods 56 are retracted, and slide-out room 65 is manually pushed inward toward camper main body 25 until side wall panel 84 is flush with side end segments 14, 16 and locking channels 100 are in line with channels 110 of side end segments 14, 16. After wings 28, 32 are slid inward such that slide rails lock slide-out room 65, roof 26 can be lowered into engagement with slide-out room 65 as shown in FIG. 8 and tent camper 10 is ready for transport to another destination.

While this invention has been described as having a preferred design, the present invention may be further modified within the spirit and scope of this disclosure and the appended claims. For example, other types or numbers of bearing mechanisms sufficient to allow sliding movement of slide-out room 65 may be substituted. Moreover, the size and shapes of the possible lateral slide-out rooms 65 are numerous. This application is therefore intended to cover any variations, uses, or adaptations of the invention using its general principles. Further, this application is intended to cover such departures from the present disclosure as come within known or customary practice in the art to which this invention pertains.

What is claimed is:

1. A tent camper for use with a towing vehicle, wherein during towing the tent camper is pulled in a longitudinal direction, the tent camper comprising:

a structural framework connectable to the towing vehicle;

at least two ground engaging wheels operationally mounted to said structural framework;

a camper main body supported by said structural framework;

a roof aligned above said camper main body, said roof movable between a lowered, storage position and a raised, camping position;

enclosure means extending between said camper main body and said roof when said roof is in its raised, camping position;

a lateral slide-out room coupled to said camper main body, said lateral slide-out room movable in a lateral direction between a retracted, storage position and an extended, operational position to provide additional living space; and two extendable rooms coupled to said camper main body, one at each end of said camper main body, each extendable room being movable along said longitudinal direction relative to said camper main body between a retracted position and an extended position to provide a sleeping berth.

2. The tent camper of claim 1 herein said lateral slide-out room includes a side wall, a front wall, and a rear wall, and wherein at least a portion of said side wall, said front wall, and said rear wall each carry a flexible enclosure means.

3. The tent camper of claim 1 wherein said lateral slide-out room includes a support frame including at least one horizontal support telescopically coupled to said structural framework.

4. The tent camper of claim 1 wherein said lateral slide-out room includes at least one stabilizer pod for engaging a ground surface when said lateral slide-out room is aligned in said extended, operational position, wherein said at least one stabilizer pod is movable between a storage, raised position and an operational, lowered position in contact with said ground surface.

5. The tent camper of claim 1 wherein said lateral slide-out room includes a floor having a bottom surface, and wherein said camper main body includes a first bearing means for operationally engaging said floor bottom surface to reduce friction between said lateral slide-out room and said camper main body when said lateral slide-out room is laterally moved.

6. The tent camper of claim 5 wherein said camper main body includes a floor and a bearing support means projecting above said camper main body floor, and wherein said first bearing means includes a plurality of rollers mounted to said bearing support means.

7. The tent camper of claim 1 wherein said lateral slide-out room includes a front wall panel with a forward surface and a rear wall panel with a rearward surface, and wherein said camper main body includes guide bearing means for operationally engaging said forward surface and said rearward surface to guide said lateral slide-out room relative to said camper main body when said lateral slide-out room is laterally moved.

8. The tent camper of claim 1 wherein said lateral slide-out room includes a front wall panel with a forward surface and a rear wall panel with a rearward surface, said lateral slide-out room further including stop means positioned on said forward surface and said rearward surface for engaging said camper main body and positively halting the lateral extension of said lateral slide-out room at said extended, operational position.

9. The tent camper of claim 1 wherein said extendable rooms are located above said slide-out room when in their respective retracted position.

10. A tent camper for use with a towing vehicle, wherein during towing the tent camper is pulled in a longitudinal direction, the tent camper comprising:

a camper main body;

framework means for supporting said camper main body and connecting said camper main body to the towing vehicle;

ground engaging means operationally mounted to said framework means;

a roof aligned above said camper main body, said roof movable between a lowered, storage position and a raised, camping position;

enclosure means extending between said camper main body and said roof when the roof is in its said raised, camping position;

a lateral slide out room coupled to said camper main body and movable in a lateral direction between a retracted, storage position and an extended, operational position to provide additional living space, said lateral slide-out room including a rigid base platform assembly and a collapsible top covering said platform assembly, said base platform assembly comprising a front wall panel, a side wall panel, a rear wall panel, and a floor; and at least one extendable room coupled to said camper main body, each extendable room being movable in said longitudinal direction between a retracted position within said camper main body and an expanded position outward of said main body to provide a sleeping berth.

11. The tent camper of claim 10 wherein said lateral slide-out room includes at least one stabilizer pod for engaging a ground surface when said lateral slide-out room is aligned in said extended, operational position, said at least one stabilizer pod being movable between a storage, raised position and an operational, lowered position in contact with said ground surface.

12. A tent camper for use with a towing vehicle comprising:

a structural framework connectable to the towing vehicle;

at least two ground engaging wheels operationally mounted to said structural framework;

a camper main body supported by said structural framework;

a roof aligned above said camper main body, said roof movable between a lowered, storage position and a raised, camping position;

enclosure means extending between said camper main body and said roof when the roof is in its said raised, camping position;

an extendable room coupled to said camper main body, said extendable room movable from a stored location in a longitudinal direction from said camper main body and expandable to provide a sleeping berth; and a lateral slide-out room coupled to said camper main body, said lateral slide-out room movable in a lateral direction between a retracted position and an extended position to provide additional living space;

said extendable room including means for interlocking with said lateral slide-out room to secure the lateral slide-out room in its said retracted position when in said stored location.

13. The tent camper of claim 12 wherein said lateral slide-out room includes a side wall, a front wall, and a rear wall, and wherein at least a portion of said side wall, said front wall, and said rear wall each includes a flexible enclosure means.

14. A tent camper for use with a towing vehicle, wherein during towing the tent camper is pulled in a longitudinal direction, the tent camper comprising:

a structural framework connectable to the towing vehicle;

at least two ground engaging wheels operationally mounted to said structural framework;

a camper main body supported by said structural framework;

a roof aligned above said camper main body, said roof movable between a lowered, storage position and a raised, camping position;

enclosure means extending between said camper main body and said roof when said roof is in its raised, camping position; and a lateral slide-out room coupled to said camper main body, said lateral slide-out room movable in a lateral direction between a retracted, storage position and an extended, operational position to provide additional living space;

said lateral slide-out room including a floor having a bottom surface, said camper main body including a first bearing means for operationally engaging said floor bottom surface to reduce friction between said lateral slide-out room and said camper main body when said lateral slide-out room is laterally moved;

said camper main body including a floor and a bearing support means projecting above said camper main body floor, said first bearing means including a plurality of rollers mounted to said bearing support means;

said lateral slide-out room including a second bearing means extending below said lateral slide-out room floor to reduce friction between said lateral slide-out room and said camper main body when said lateral slide-out room is laterally moved.

* * * * *